United States Patent

[11] 3,633,679

| [72] | Inventors | Franklyn L. Dahlberg<br>Minden, La.;<br>Willie F. Brewer, Yazoo, Miss. |
|---|---|---|
| [21] | Appl. No. | 865,807 |
| [22] | Filed | Oct. 13, 1969 |
| [45] | Patented | Jan. 11, 1972 |
| [73] | Assignee | FMC Corporation<br>San Jose, Calif. |

[54] MOBILE SELF-SUPPORTING TILLER
9 Claims, 13 Drawing Figs.

[52] U.S. Cl. ........................................... 172/123,
172/7, 172/35, 172/386, 172/417, 172/484
[51] Int. Cl. ........................................... A01b 33/00
[50] Field of Search........................................... 172/118,
452, 465, 492, 407, 413, 310, 315, 316, 483, 484,
47, 76, 79, 119–123, 307, 49, 51, 100, 395, 605,
663, 111, 238, 239, 244, 397, 323, 324, 418, 458,
491

[56] References Cited
UNITED STATES PATENTS

| 2,076,666 | 4/1937 | Ohlendorf.................... | 172/395 |
|---|---|---|---|
| 2,526,396 | 10/1950 | Nowlin......................... | 172/47 |
| 2,777,375 | 1/1957 | Carlin et al. .................. | 172/413 |
| 2,957,529 | 10/1960 | Kaller........................... | 172/123 |
| 2,968,353 | 1/1961 | Edman.......................... | 172/239 |
| 3,064,371 | 11/1962 | Kutzler.......................... | 37/126 A |
| 3,111,174 | 11/1963 | Fry et al......................... | 172/413 |
| 3,233,680 | 2/1966 | Arzuian et al. ................ | 172/4 |

*Primary Examiner*—Robert E. Pulfrey
*Assistant Examiner*—R. T. Rader
*Attorneys*—F. W. Anderson and C. E. Tripp ABSTRACT: A self-supporting tiller having a jackknife frame mounted on two front caster wheels and two rear caster wheels. A hydraulically operated lifting mechanism which is included in a tiller control system is carried by the self-supporting tiller and is responsive to speed changes of a power input shaft connected to a rotary ground-working tool and to a hydraulic pump for raising the tiller when forces on the tool cause the speed of the input shaft to drop below a predetermined minimum speed and to effect lowering of the tool when the shaft speed returns to the predetermined minimum speed. The control system includes a manually operated control which bypasses the automatic controls and is used for manual raising of the tool. The control system also includes front caster wheel locks which automatically prevent the front caster wheels from pivoting/out of position which will guide the tiller along a straight forward path when the tool is lowered into tiller position, and which releases the caster wheel for free-swinging movement when the tool is raised. Manually operated rear caster locks are provided for locking the rear wheels in a straight forward position when the rotary tool is raised and is to be transported long distances.

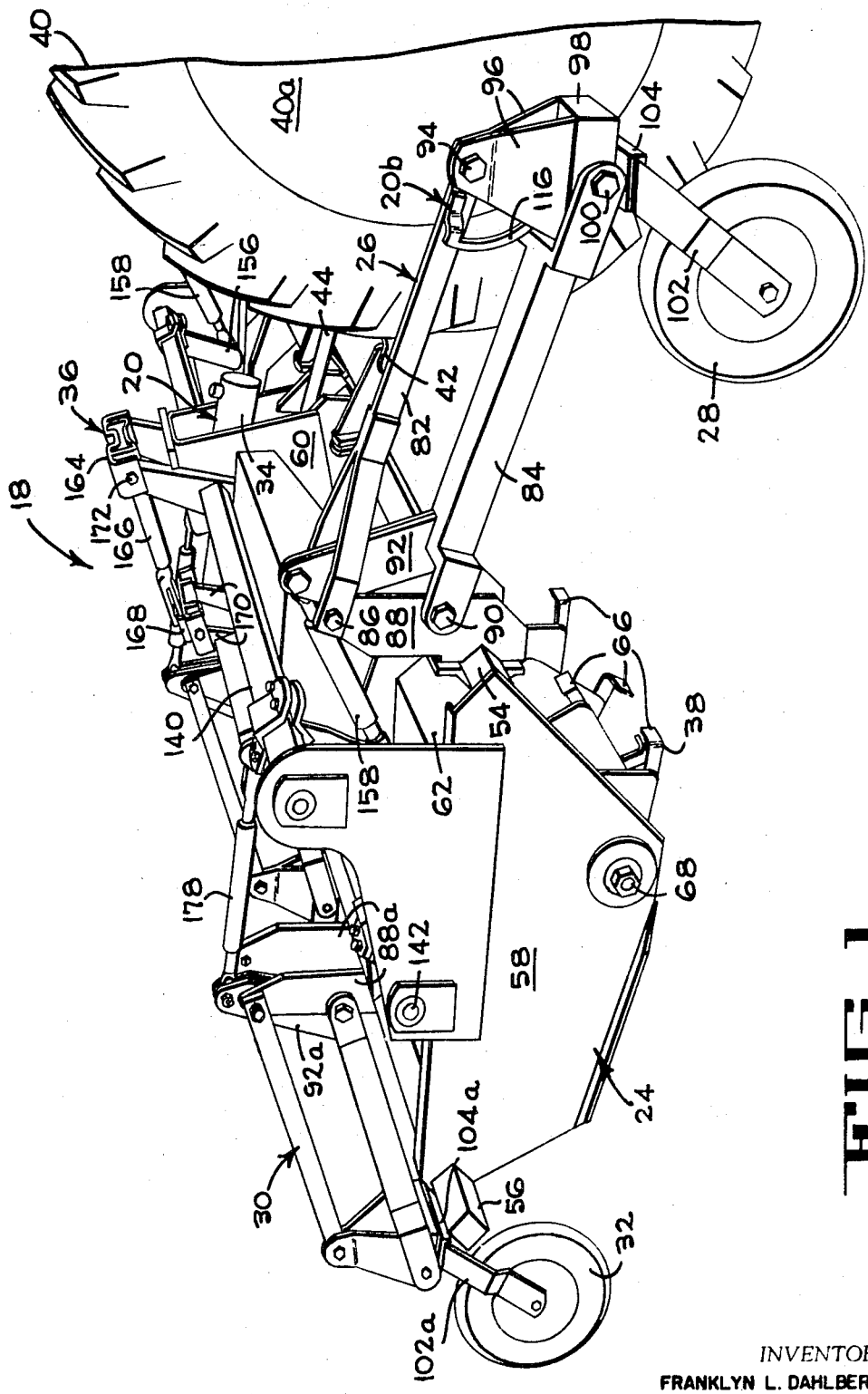

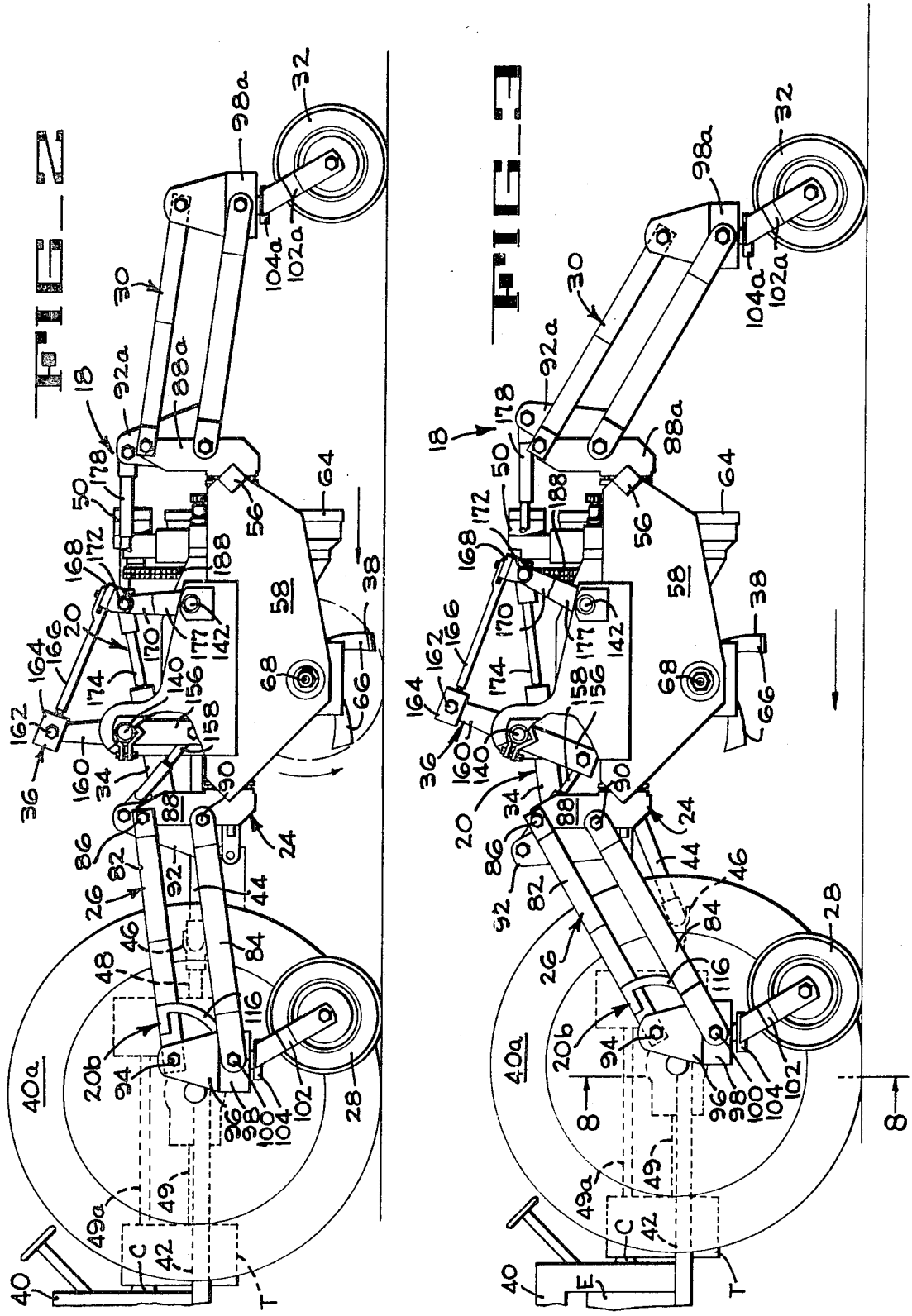

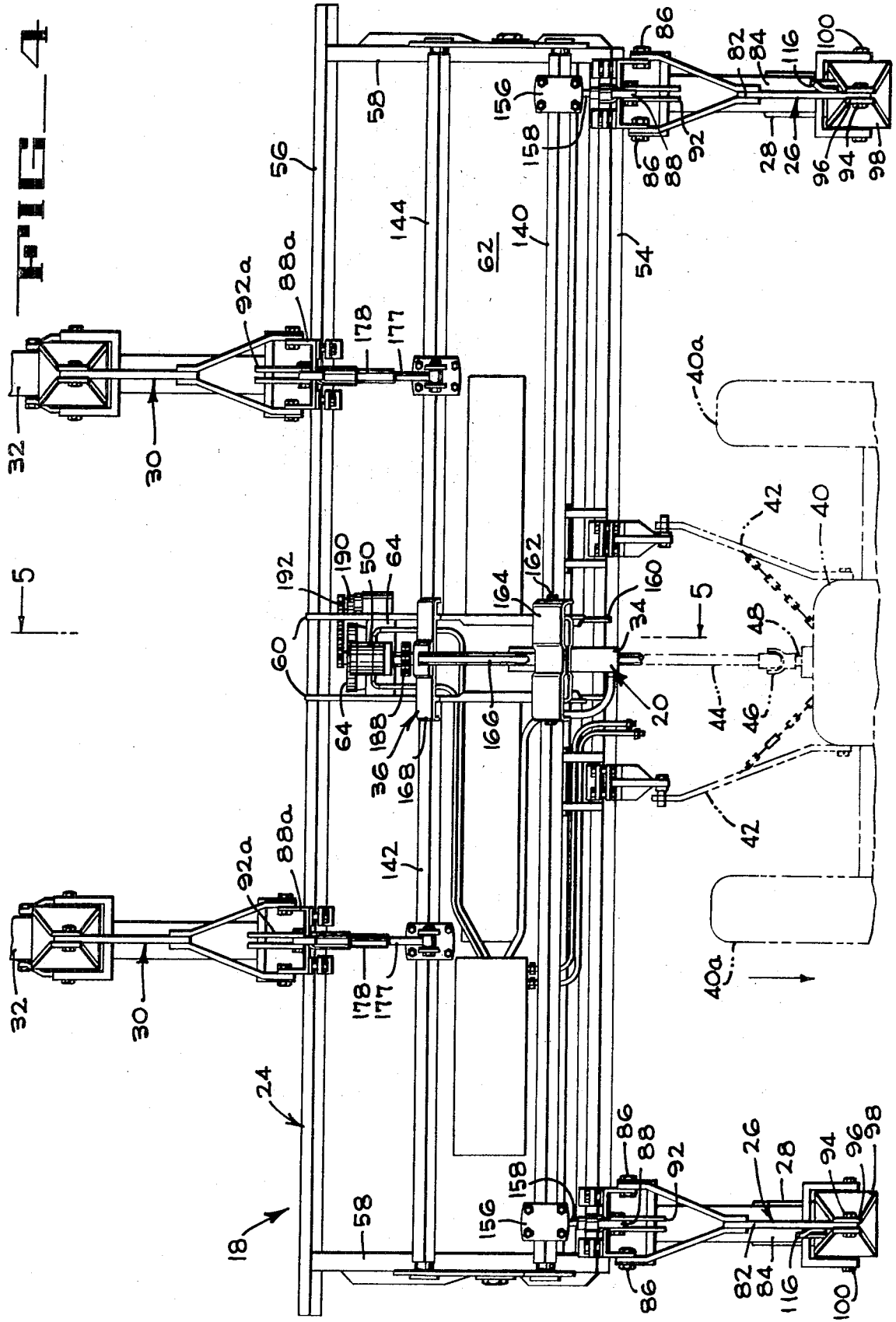

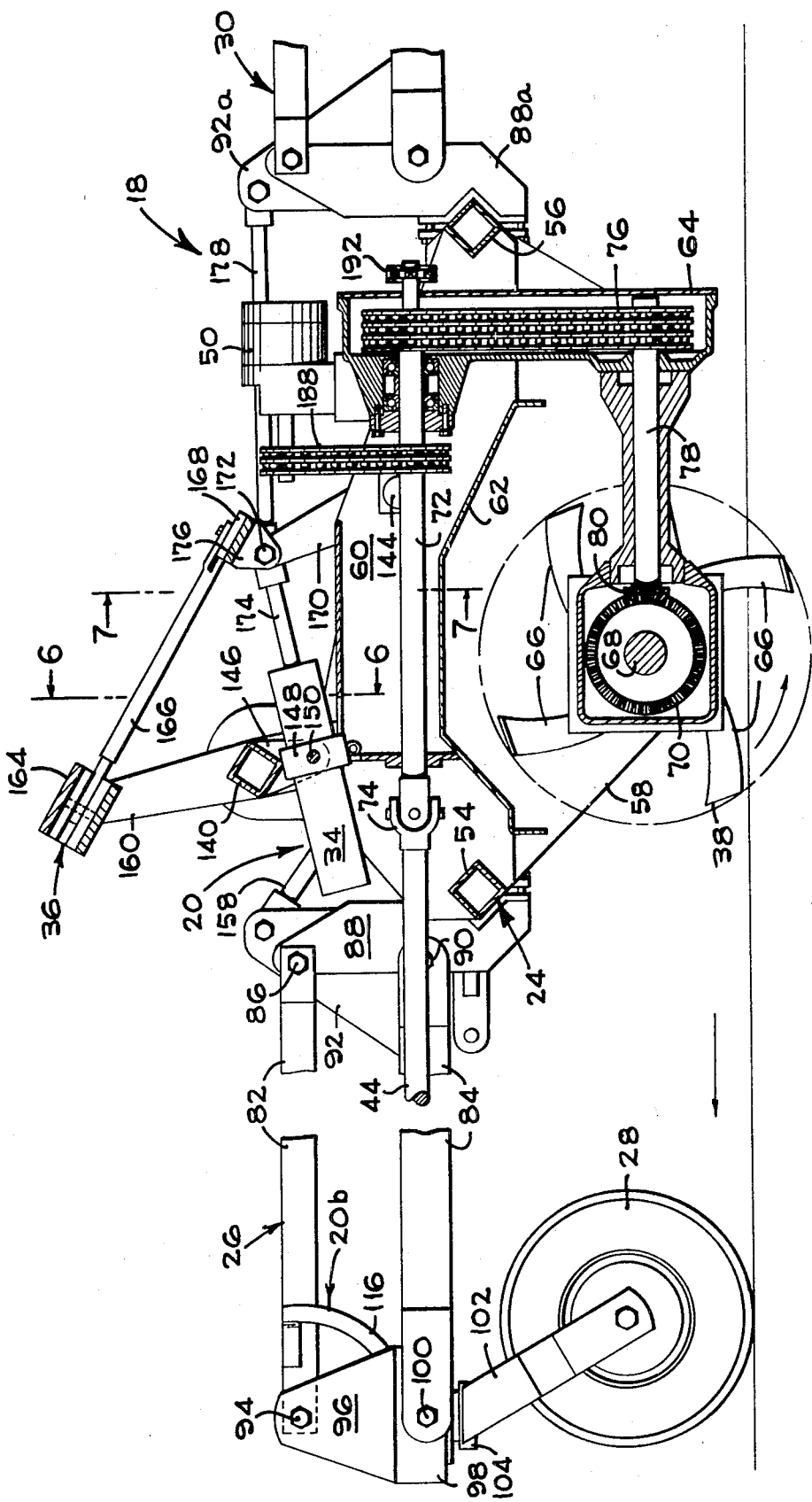

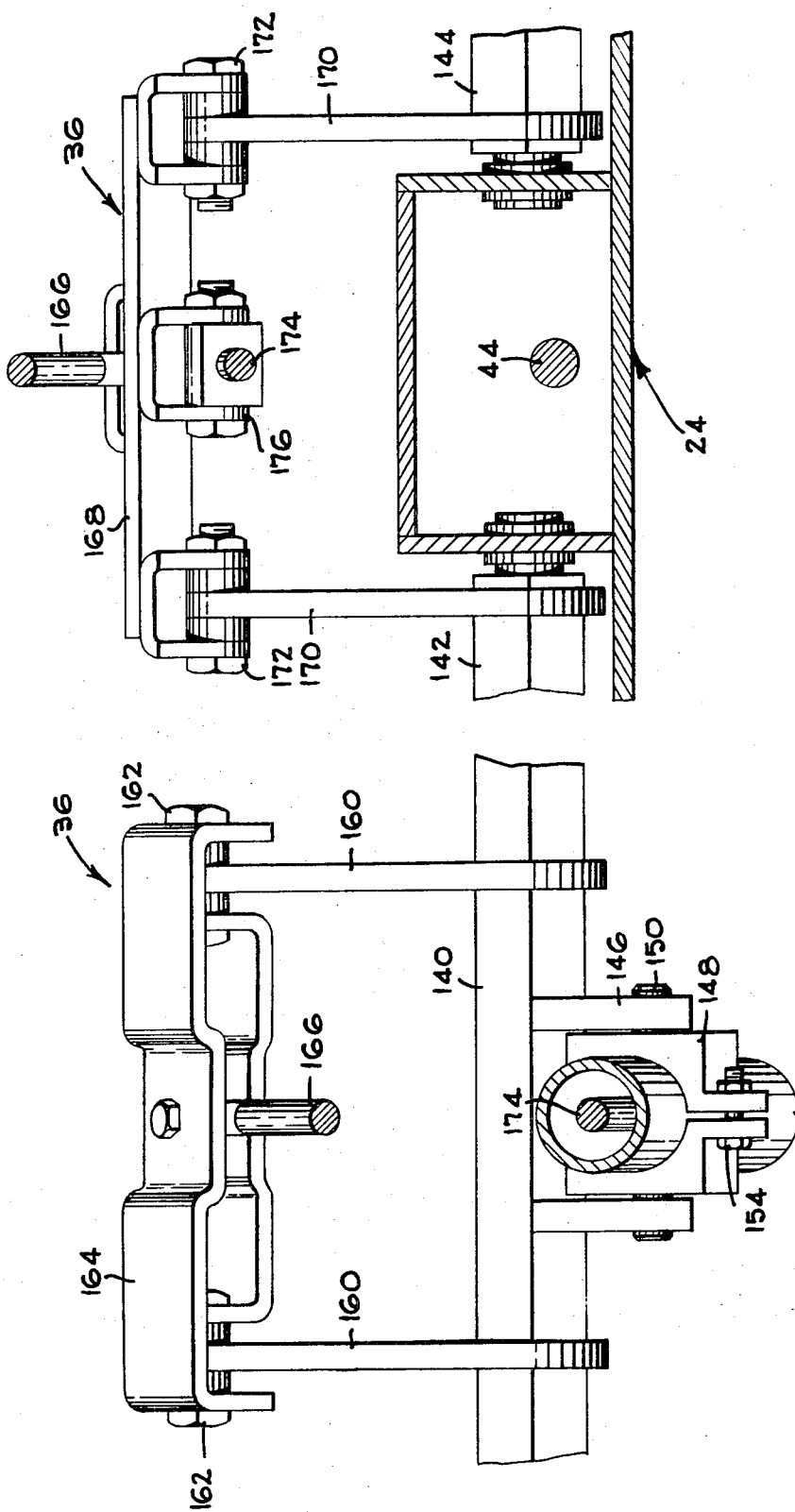

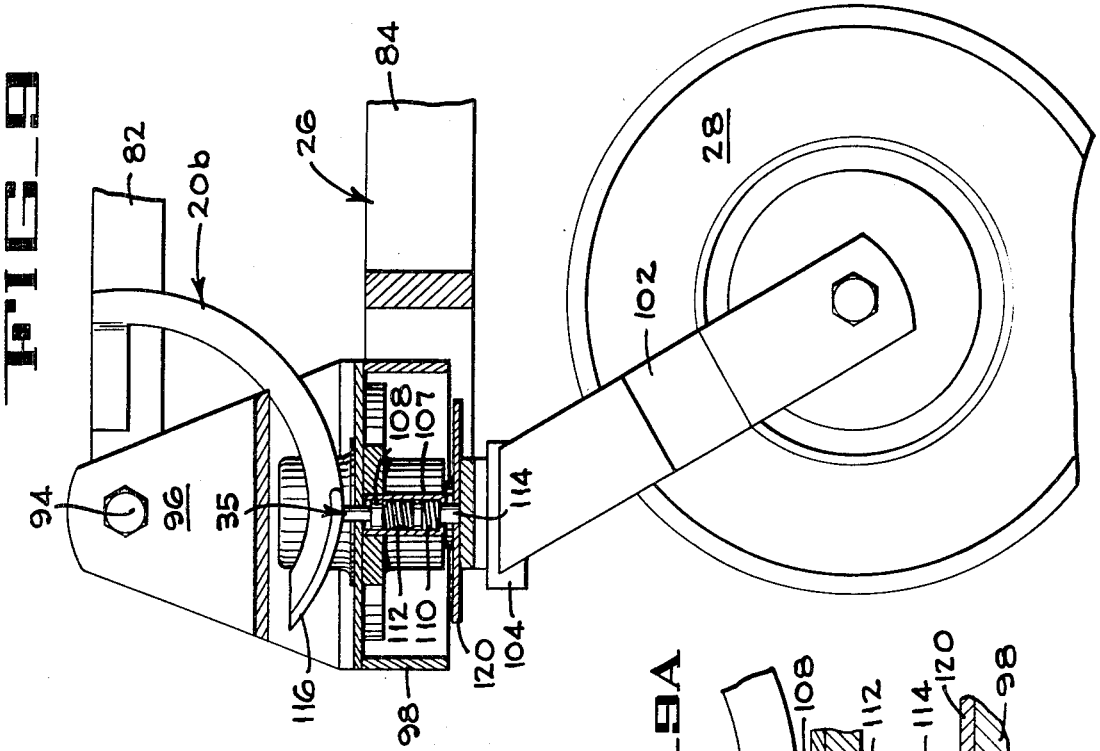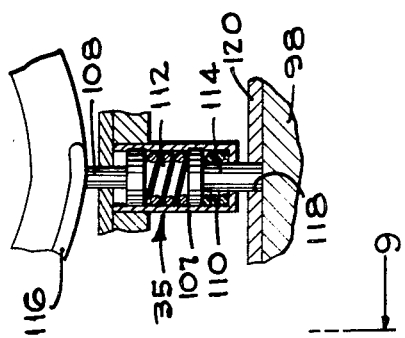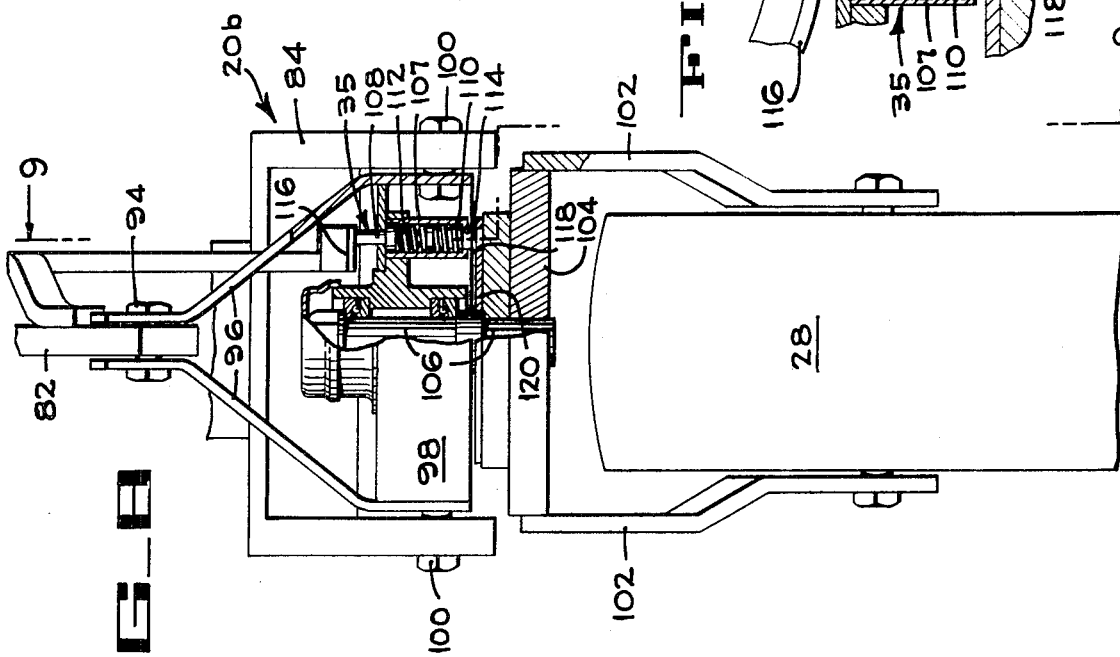

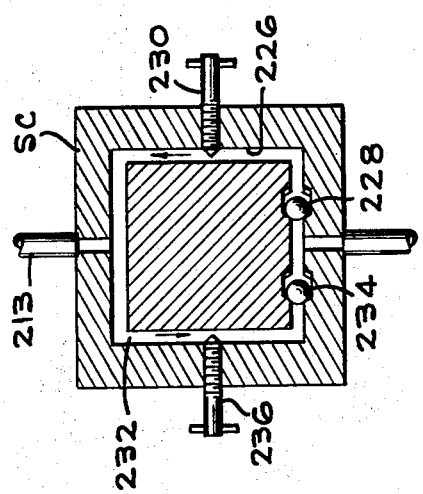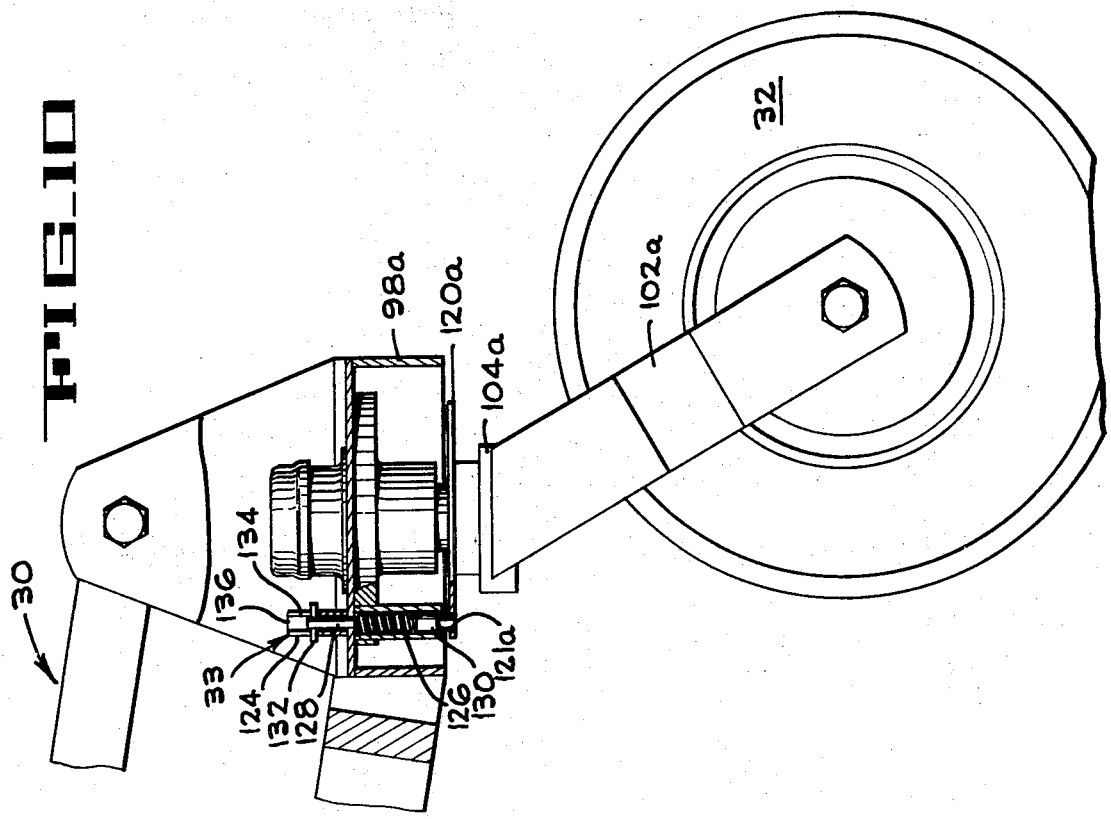

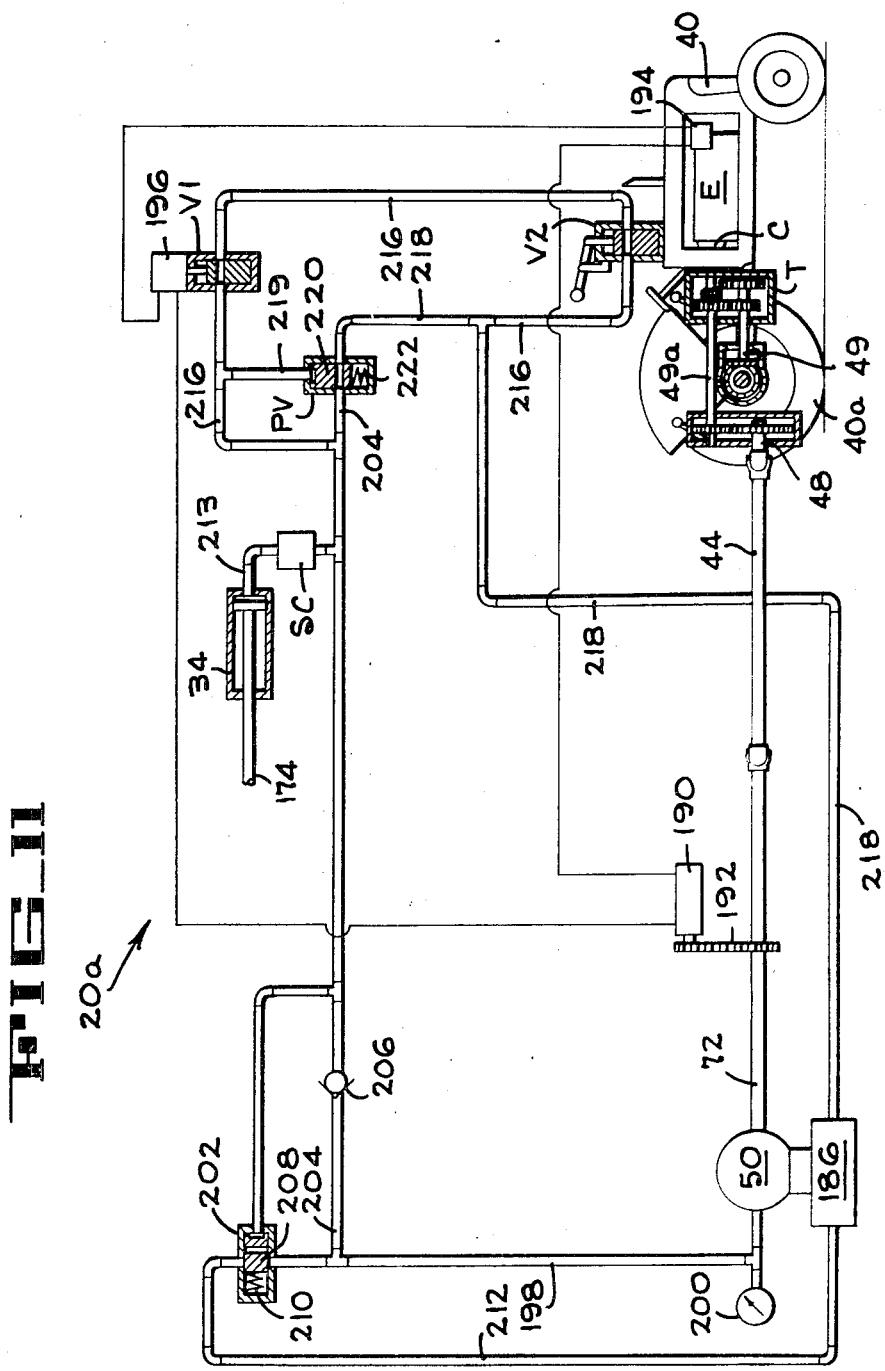

MOBILE SELF-SUPPORTING TILLER

BACKGROUND OF THE INVENTION

1. Field of the Invention

This invention pertains to agricultural equipment and more particularly relates to a vertically adjustable, self-supporting tiller having a control system for raising and lowering the rotatable ground working tool in accordance with speed variations of a power input shaft to the tool, and having a caster wheel locking mechanism responsive to elevation changes of the tool.

2. Description of the Prior Art

Control systems for raising and lowering ground working tools in response to detected variations in drawbar forces forward tractor speeds, or in torque acting on a rotary tiller are known. The tilling mechanisms controlled by such systems, whether of the moldboard plow type or the rotary tiller type are usually supported on the rear ends of tractors and rely on the standard hydraulic lift system of the tractor for raising of the tool in response to increases in load imparted to the tool due to varying soil conditions or excessive depth or cut of the tool.

Because these prior art systems rely on the standard hydraulic system of tractors, which hydraulic systems are not designed for rapid response and which vary in operating characteristics from one type of tractor to another, the operator has little if any opportunity to preset the raising and lowering rates of the system so as to adapt the sensitivity of the system to handle the particular type of soil being worked. Also, since the tractor borne tools are usually mounted in a cantilever fashion rearwardly of all wheels of the tractor, any raising of the front of the tractor, due to changes in elevation or unevenness of the ground over which the tractor is driven, will not only result in an unnecessary variation in the depth of cut of the tool but will also cause the tool to lower thereby tending to overload the tractor engine. If such overloading is sufficient to actuate the lifting mechanism, the weight of the tool being lifted additionally tends to lower the rear end of the tractor thus further delaying the lifting of the tool and correction of the overload.

SUMMARY OF THE INVENTION

The self-supporting tiller of the present invention includes a frame mounted on four caster wheels with the soil-working tool disposed intermediate the forward and rear caster wheels. A tiller control system is mounted on the frame and includes a hydraulic pump and a power cylinder with associated adjustable speed control valves which are separate and apart from the hydraulic system of the tractor. The tractor is used only for the purpose of pulling the tiller along its path of travel and for supplying power from the tractor engine to an input or power takeoff shaft to the rotary ground-working tool and to the hydraulic pump. Because a separate controlable hydraulic lifting system is used, the operator can adjust the sensitivity of the hydraulic system for any type of soil being processed. After such adjustments have been made, the system will automatically raise and lower the ground-working tool in response to variations in the speed, as opposed to the torque, of the power input shaft without danger of the engine overloading to such an extent that it stalls or slows down and causes the tool to be lifted completely out of the ground before the input shaft again returns to its minimum speed. If the engine periodically stalls or approaches stalling, it is apparent that the average forward speed of the tiller will be reduced and less acreage will be cultivated per hour. If the ground-working tool is periodically lifted completely from the soil or the variations of working depths within the soil is excessive, it is apparent that the soil will be improperly tilled. Thus, the sensitivity of the lifting system is of utmost importance to ensure a maximum acreage per hour rate and proper tillage of the acreage covered.

Also, the tiller control system includes front caster locking means which automatically lock the front caster wheels in a straightforward position when the ground-working tool is lowered thereby minimizing lateral sway of the tiller during the tilling operation, and releases the front caster wheels for free pivotal movement when the tiller is raised. Manually operable caster wheel locks are associated with the rear caster wheels and are locked in a straightforward position when it is desired to transport the tiller long distances.

BRIEF DESCRIPTION OF THE DRAWINGS

FIG. 1 is a perspective of a tiller embodying the control system of the present invention.

FIG. 2 is a side elevation with parts broken away illustrating the opposite side of the tiller of FIG. 1 with the ground-working tool supported on the untilled ground.

FIG. 3 is a side elevation similar to FIG. 2 but illustrating the tiller jackknifed to its uppermost position.

FIG. 4 is a top plan view of the tiller when positioned as illustrated in FIG. 2.

FIG. 5 is an enlarged vertical section of the forward portion of the tiller taken substantially along the lines 5—5 of FIG. 4 and illustrating certain drive parts with the rotary soil-working tool at its full depth in the soil, the tractor being omitted from this view.

FIG. 6 is an enlarged section taken along lines 6—6 of FIG. 5 illustrating the structure for supporting the hydraulic cylinder and certain linkage connections for the lifting mechanism.

FIG. 7 is an enlarged section taken along lines 7—7 of FIG. 5 illustrating other linkage connections for the lifting mechanism.

FIG. 8 is an enlarged front elevation looking in the direction of arrows 8—8 in FIG. 3 illustrating one of the front caster wheel locks in a raised inoperative position, certain parts being cut away and other parts being shown in section.

FIG. 9 is a side elevation partly in section taken along lines 9—9 of FIG. 8 and illustrating one of the front wheel locks in a locked position.

FIG. 9A is an enlarged fragmentary view of the front wheel lock of FIG. 9.

FIG. 10 is an enlarged side elevation partly in section illustrating one of the manually operated rear caster wheel locks.

FIG. 11 is a schematic diagram illustrating the hydraulic and the electrical circuits of the control system of the present invention.

FIG. 12 is a diagrammatic section illustrating a speed control valve which may be adjusted to control the rate of both upward and downward movement of the ground working tool.

DESCRIPTION OF PREFERRED EMBODIMENT

In general, the self-supporting tiller 18 (FIGS. 1 to 5) of the present invention includes a tiller control system 20 having a lift control system 20a (FIG. 11) and a directional control system 20b (FIGS. 8 and 9) mounted on a mobile frame 24 of the tiller 18. The frame 24 includes two sets of front parallelogram linkages 26 which mount two front caster wheels 28 to the body of the frame, and rear parallelogram linkages 30 which mount two rear caster wheels 32 to the body of the frame. The rear caster wheels 32 are manually locked in a straightforward position by rear wheel locks 33 (FIG. 10) when the tiller is to be moved from place to place, and the front caster wheels 28 are locked in a forward position by front wheel locks 35 (FIGS. 8 and 9) when the frame 24 is lowered, and the front caster wheels are released for free-swinging movement when the frame is raised.

A power cylinder or hydraulic cylinder 34 is connected to the four pair of parallelogram linkages 26 and 30 by a linkage system 36. Actuation of the hydraulic cylinder 34 will cause the mobile frame 24 to jackknife upwardly as illustrated in FIG. 3 thereby raising a rotary tiller or other ground working tool 38. Deenergization of the hydraulic cylinder permits gravity to lower the ground working tool 38.

The tiller 18 is connected to a standard tractor 40 of well-known design by a pair of drawbars 42 (FIG. 4) and by a power input shaft 44 of the usual telescoping type which is coupled by a universal joint 46 (FIG. 4) to the power takeoff shaft 48 of the tractor. The tractor 40 (FIG. 11) includes an engine E with the usual engine controls, a clutch C, a multispeed transmission T connected through a wheel drive train 49 to drive wheels 40a. A power takeoff drive train 49a connects the engine E directly to the power takeoff shaft 48 through the clutch C but without passing through the transmission T. The operator rides on the tractor and controls the forward movement and forward speed of the tiller by means of the usual tractor steering controls and transmission. The input shaft 44 supplies power to the rotary tiller 38 and to a hydraulic pump 50 both of which are supported on the tiller frame 24. The hydraulic pump 50 is connected to the hydraulic cylinder 34 and is included in the lift control system 20a (FIG. 11) of the tiller control system 20. The lift control system 20a is responsive to variations in speed of the input shaft 44 from a predetermined minimum speed. If the load on the rotary ground-working tool 38 overloads the tractor engine and causes the input shaft to rotate slower than the predetermined speed, the lift control system 20a raises the tool 38 sufficiently to reduce the load and permit the input shaft to return to a speed equal to or in excess of the predetermined minimum speed. Also, if the torque load is normal but the operator wishes to raise the tool from the soil such as when making a turn, the operator need only reduce the shaft speed below the predetermined speed by reducing the throttle setting.

More specifically, the tiller 18 includes the frame 24 (FIGS. 2 and 4) which is elongated transversely of the direction of movement of the tiller so as to cultivate rows that are about 14 feet wide. The frame includes transversely extending bars 54 and 56 of square cross section to which longitudinal end walls 58 and central walls 60 (FIGS. 4 and 5) are rigidly secured. A dirt deflector plate 62 (FIG. 5) is disposed above the ground-working tool 38 to control the movement of dirt and trash and to add rigidity to the frame.

As best shown in FIG. 5, the ground-working tool 38 is illustrated as a rotary tiller of well-known design and is rotatably supported by the end walls 58 and by a transmission unit 64. The ground-working tool includes a plurality of sets of tilling blades 66 (FIGS. 1 and 5) which are rigidly secured at spaced intervals to a tiller shaft 68. The shaft 68 is keyed to a bevel gear 70 of the transmission unit 64, which unit is rigidly secured to and is disposed between the two central walls 60 of the frame 24. The shaft 68 is driven from the tractor's power takeoff shaft 48 (FIG. 4) through input shaft 44 which is connected to the power takeoff shaft 48 by the universal joint 46 and to a transmission drive shaft 72 by universal joint 74. The transmission drive shaft 72 is connected by a multiple chain drive 76 (FIG. 5) to a driven shaft 78 which has a bevel gear 80 keyed thereto and disposed in driving engagement with the bevel gear 70.

As best shown in FIGS. 1 and 4, the front parallelogram linkages 26 which connect the two front caster wheels 28 to the frame 24 are mounted outwardly of the tractor wheels near the end walls 58. Each linkage 26 includes an upper bar 82 and a lower bar 84. The upper bar 82 has a forked upper end which is pivoted by bolts 86 to spaced upstanding walls of a bracket 88 that is rigidly secured to the transverse bar 54. The upper end of the lower bar 84 is likewise forked and pivoted to the bracket 88 by bolts 90. The upper end of the lower bar 84 also includes an upstanding centrally disposed lever 92 through which the raising and lowering force is imparted to the caster wheel 28.

The other or lower end of the upper bar 82 is pivotally connected by a bolt 94 between the upper end of two inwardly deflecting upstanding walls 96 (FIGS. 8 and 9) of a front caster wheel support body 98. The lower end of the lower bar 84 is forked and is pivotally connected by bolts 100 to a lower rectangular portion of the body 98. The caster wheel 28 is journaled to the lower end of rearwardly inclined forks 102 that are welded to a horizontal support plate 104 having a vertical spindle 106 rigid therewith and extending upwardly through bearings in the caster wheel support body 98.

An important feature of the invention is that the direction control system 20b of the present invention provides for the automatic locking of the front caster wheels during the tilling operation thereby minimizing transverse movement of the tiller 18 due to obstructions or unevenness in the soil. In this regard, each front caster wheel 28 is provided with one of the aforementioned front wheel locks 35.

Each front wheel lock 35 (FIGS. 8 and 9) comprises a vertical sleeve 107 secured to the caster wheel support body 98 and having a T-shaped locking pin 108 surrounded by a fist spring 110 slidably mounted therein. The locking pin 108 includes a small diameter stem which projects through a small diameter hole in the lower end of the sleeve. A second spring 112 is slidably received in the sleeve 107 and is disposed between the head of the locking pin 108 and the head of a similarly shaped but inverted actuating pin 114. The actuating pin 114 includes a stem which projects through a small hole in the upper wall of the body 98 in position to be engaged and actuated by a curved cam 116 that is secured to the upper bar 82 of the associated parallelogram linkage 26. The curvature of the cam 116 is such as to engage the actuating pin 114 and forces the pin downwardly when the tiller is in its ground-working position shown in FIGS. 5 and 9 thereby compressing both springs 110 and 112 causing the stem of the locking pin 108 to enter a single hole 118 in a disc 120 that is secured to the support plate 104 which pivots with the caster wheel 28. The hole 118 is positioned so that it will be aligned with and will receive the pin 108 only when the caster wheel 28 is in its straightforward position. When the tiller is in its raised position illustrated in FIGS. 1 and 3, the cam 116 allows the first spring 110 to raise the locking pin 108 out of the hole as illustrated in FIG. 8 thus allowing the front wheel 28 to caster freely permitting the tractor to turn the tiller around sharp curves. It will also be noted that the rear wheels 40a (FIG. 4) of the tractor are spaced closer together than front caster wheels 28 thus enhancing the ability of the tractor 40 and tiller 18 to make sharp curves as a unit.

The rear parallelogram linkages 30 and rear caster wheels 32 are quite similar to the structure for supporting the front caster wheels and, accordingly, will not be described in detail. Parts of the rear parallelogram linkages and of the rear caster wheels which are similar to parts of the front wheel assemblies will be assigned the same numerals followed by the letter "a."

It will be noted that the rear caster wheels 32 are spaced closer together than are the front caster wheels, and that the rear parallelogram linkages are pivoted to brackets 88a (FIGS. 1 and 4) that are secured to the transverse bar 56 of the frame 24.

Whereas, the front caster wheels 28 are locked in a straight forward position by the front wheel locks 35 when the ground-working tool is lowered to its tilling position, it will be noted that the rear wheels 32 are free to caster at this time thereby allowing the tractor driver to make reasonable changes in direction without lifting the ground-working tool from the soil. However, when it is desired to move the tiller long distances it is desired to lock the rear wheels in a straightforward position by means of the aforementioned rear wheel locks 33 (FIG. 10).

Each rear wheel lock 33 includes a sleeve 124 which is secured to the associated caster wheel support body 98a and has a spring 126 and a locking pin 128 slidably positioned therein. The locking pin 128 includes a small diameter shank having a large diameter collar 130 near its lower end and a crossbar handle 132 near its upper end. The spring 126 is disposed between the collar 130 and the upper wall of the body 98a, which wall is provided with a hole through which the shank extends, thereby urging the locking pin downwardly. The crossbar handle 132 is slidably received in slots 134 in the upper end 136 of the sleeve 124. The sleeve 124 is concentric with the locking pin 128 and is rigidly secured to the upper wall of the body 98a.

When the locking pin 128 is positioned as shown in FIG. 10, the spring 126 urges the pin downwardly so that its lower end enters a hole 121a in a locking disc 120a that is secured to the support plate 104a of the caster wheel supporting forks 102a. The disc 120a has a single hole therein which receives the locking pin 128 only when the rear caster wheel 32 is in a straightforward position.

The rear caster wheels 32 are unlocked for free-castering action during cultivation by manually raising the locking pin 128 and pivoting the pin 90° so that the crossbar handles 132 rest upon the upper end 136 of the sleeve 124. When in this position, the lower end of each pin 128 of the two rear wheel locks 33 are disposed above their associated locking discs 120a.

The linkage system 36 which is actuated by the hydraulic cylinder 34 for raising or lowering the ground working tool 38 is best shown in FIGS. 2 to 5 and includes the above-described parallelogram linkages 26 and 30.

The linkage system 36 includes a forward pivot bar 140 which extends the full width of the tiller 18 and two axially aligned rear pivot bars 142 and 144 (FIGS. 4 and 7) all of which are pivotally mounted on the frame 24. The forward pivot bar 140 has a yoke 146 (FIGS. 5 and 6) rigidly secured thereto which pivotally supports the split block 148 by means of pins 150. The hydraulic cylinder 34 is clamped to the split block 148 by a bolt 154. The forward pivot bar 140 is connected to the front parallelogram linkages 26 by downwardly projecting lever arms 156 (FIGS. 2 to 4) and adjustable connecting rods 158 pivotally connected between the lower ends of the arms 156 and the upper ends of the lever 92 of the associated parallelogram linkages 26.

A pair of upwardly projecting actuating levers 160 (FIGS. 5 and 6) are rigidly connected to the central portion of the forward pivot bar 140 and have their upper ends pivotally connected by bolts 162 to a yoke 164. One end of a connecting rod 166 is bolted to the yoke 164 while the other end of the rod 166 is bolted to a similar yoke 168 (FIG. 7) that is pivotally connected to the upper ends of two rear levers 170 by pivot bolts 172. The rear levers 170 are rigidly connected to the two rear pivot bars 142 and 144 as shown in FIG. 7. The piston rod 174 of the hydraulic cylinder 34 is pivotally connected to a U-shaped bracket 176 that is rigidly connected to the yoke 168.

The rear parallelogram linkages 30 are pivotally connected to their associated bars 142 or 144 by upstanding levers 177 (FIGS. 2, 3 and 4) which are rigidly secured to the pivot bars 142 and 144. The upper ends of the levers 177 are pivotally connected to the associated levers 92a of the parallelogram linkages 30 by adjustable connecting rods 178.

It is apparent, therefore, that introduction of hydraulic fluid into the cylinder 34 will cause the piston rod 174 to move from its retracted position to its extended position to the right (FIGS. 2, 3 and 5) thereby causing the front parallelogram linkages 26 and rear parallelogram linkages 30 to jackknife thus lifting the rotary tiller 38 from its working position in the ground as illustrated in FIG. 5 to a jackknifed or raised position as illustrated in FIG. 3.

As mentioned previously, an important feature of the invention is that the lift control system 20a (FIG. 11) of the present invention automatically controls the elevation of the rotary tiller or ground-working tool 38 in response to variations in the speed of the input shaft 44. As diagrammatically illustrated in FIG. 11, the lift control system 20a includes the hydraulic pump 50 which receives hydraulic fluid from a sump 186 and which is driven from the power takeoff shaft 48 of the tractor 40 through input shaft 44, shaft 72, and a chain drive 188 (FIG. 5). During normal operation, input shaft 44 and shaft 72 are preferably driven at a predetermined speed substantially equal to the speed of the maximum torque of the power takeoff shaft, which speed will of course vary somewhat with the type of engine provided and the gear ratio to the power takeoff.

With certain tractors, the maximum torque speed of their power takeoff shafts lie within the range of about 1,000 to 1,100 r.p.m., which range will be considered the predetermined input shaft speed for purposes of describing the present invention. However, it will be understood that other predetermined speed ranges may be used.

An underspeed governor 190 is connected to the shaft 72 by a chain drive 192 and includes internal switches which are electrically connected to the battery 194 of the tractor 40 and to the solenoid 196 of a normally closed control valve V1 in the hydraulic circuit. The underspeed governor is adjustable and includes an internal switch which is normally open and may be adjusted to close when the speed of the input shaft 44 is above about 950 to 975 r.p.m. thereby energizing the solenoid 196 and opening the valve V1 permitting hydraulic fluid to flow therethrough. The underspeed governor may be a Synchro-Start, Model GSUR, Part No. S.A. 909B–9GK manufactured by Synchro-Start Products, Inc. 8151 N. Ridgeway Ave., Skokie, Illinois. The pump 50 supplies high-pressure fluid through a high-pressure conduit 198 which communicates with a pressure gauge 200 and with a normally closed unloading valve 202. High-pressure fluid flows from the conduit 198 through a conduit 204 and check valve 206, which check valve permits flow to the right but not to the left as viewed in FIG. 11. If excessive pressure build up in conduit 204 as would occur when the piston rod 174 of cylinder 34 "bottoms out" in its fully extended position, the pressure is transmitted to one end of the core 208 of the unloading valve 202 thus opening the valve against the resistance of the spring 210 and allowing the hydraulic fluid to flow through the unloading valve and return to the sump 186 through return conduit 212.

High-pressure fluid which flows through conduit 204 past the check valve 206 may flow into the hydraulic cylinder 34 through a branch conduit 213 and speed control valve SC, or may flow through a normally open pressure operated pilot valve PV and return to the sump 186 without affecting the cylinder 34 through conduits 216 and 218. The pilot valve PV is controlled by either the solenoid valve V1 or a manually operated valve V2 which valves are connected in series in a small diameter pilot line 216. The input end of the pilot line 216 is connected to the high-pressure conduit 204 between the hydraulic cylinder 34 and the pilot valve PV, while the discharge end of the pilot line 216 is connected to the low-pressure return conduit 218. A branch pilot line 219 connects the pilot line 216 to one end of the pilot valve PV and shifts the core 220 of the pilot valve to a closed position when the pressure in the line 219 exceeds the force of the spring 222.

As mentioned previously, the hydraulic control system must control the elevation of the tiller quickly enough to prevent stalling of the engine. It is also recognized that soil conditions of different ranches may require different rates of raising and lowering of the ground-working tool 38 for best result. Accordingly, the speed control valve SC as diagrammatically illustrated in FIG. 12 includes a high-pressure passage 226 having a ball check valve 228 and an adjustable needle valve 230 therein. The ball valve 228 permits fluid to flow only to the right (FIG. 12) and the needle valve 230 may be adjusted to control the rate of extension of the piston rod 174 (FIG. 11) and accordingly the upward movement of the ground-working tool 38. The speed control valve SC also includes a return passage 232 having a ball check valve 234 and a needle valve 236 therein. The ball check valve 234 permits flow only to the right (FIG. 12) and the needle valve 236 may be adjusted to vary the rate at which the ground-working tool moves downwardly. For most types of soil it has been determined that an average rate of about 3 to 4 seconds for both lifting and lowering the tool 38 between its maximum positions is desirable.

In operation, the tractor engine is started, the powered takeoff shaft 48 is engaged, and the tractor and self-supported tiller 18 is driven to the field which is to be cultivated. If the tractor is to move the tiller long distances, each rear caster wheel 32 is locked in a straightforward position by the manual rear wheel locks 33 (FIG. 10). During this transportation the operator closes the manual valve V2 (FIG. 11) thereby causing hydraulic pressure to increase in the pilot lines 216 and 219 closing pilot valve PV. Upon closing pilot valve PV high-pressure fluid flows into the cylinder 34 thereby extending the piston rod 174 and raising the ground-working tool 38 to its fully raised or jackknifed position shown in FIG. 5. Once raised, the cylinder will remain hydraulically locked in its extended position provided the valve V2 is maintained closed. Thus, the power takeoff shaft may be disengaged while the tiller is being moved from place to place.

Upon reaching the field to be cultivated, the tractor driver first manually unlocks the rear wheel locks 33, engages the power takeoff shaft 48, regulates the engine speed to obtain a power takeoff speed of 1,000 to 1,100 r.p.m., places the standard tractor transmission in one of its several available forward speed ranges, and then drives the tractor into the field. When it is desired to commence cultivation, the operator opens the manual valve V2 thus relieving the pressure on the pilot valve PV allowing the spring to move the core 220 to the open position. Opening the pilot valve PV allows the hydraulic fluid in the conduit 204 to reduce in pressure and flow directly to the sump through conduit 218. Reduction of pressure in conduit 204 allows the weight of the tiller 18 to return the piston rod 174 from its fully extended position (FIG. 3) to its fully retracted, ground-working position shown in FIG. 5. Lowering of the ground-working tool 38 into its working position also causes the cams 116 (FIG. 9) to automatically actuate the front caster wheel locks 35 thereby locking the front wheels in a straightforward position. During this tool lowering operation, fluid flows from the cylinder 34 through passage 232 (FIG. 12) past needle valve 236, past ball check valve 234 of the speed control valve SC, and then flows into the conduit 204 (FIG. 11) which is at low pressure at this time. As mentioned previously, the needle valve 236 is adjustable and is usually adjusted so as to control the movement of the tiller from its fully raised to its lowermost position in about 3 to 4 seconds.

During cultivation of the field differences in the condition of the soil will resist rotation of the rotary ground-engaging tool different amounts. If the tiller enters a portion of the field where the soil resists cultivation to such an extent that the input shaft slows down to a speed below about 950 to 975 r.p.m., the underspeed governor 190 will energize solenoid 196 thereby automatically closing valve V1. Closing valve V1 causes pressure to increase in pilot line 219 thereby shifting the core 220 of pilot valve PV to its closed position. Closing pilot valve PV causes the pressure in conduit 204 to build up to a maximum pressure thereby moving the piston rod 174 from its retracted position toward its extended position causing the ground-working tool to raise. Normally a slight raising of the tool will reduce the overload permitting the input shaft 44 to return to its predetermined speed of 1,000 to 1,100 r.p.m. at which time the underspeed governor 190 deenergizes the valve V1. Deenergization of the valve V1 permits the spring 222 of pilot valve PV to open thus allowing the fluid to flow out of the cylinder 34 returning the ground-working tool 38 to its maximum working depth.

If the operator finds that the soil conditions of a particular field are so severe as to cause the engine to stall or approach stalling before the tool is raised sufficiently to relieve the overload, the operator may regulate the needle valve 230 (FIG. 12) in the speed control valve SC so that the cylinder 34 will more rapidly raise the tool 38. In this regard, it will be understood that if the needle valves 230 and/or 236 are adjusted so that the cylinder's response is so slow as to cause excessive variations in the speed of the input shaft 44, the ground-working tool will "overcorrect," i.e., will be raised too high for the particular overload condition. Such "overcorrection" will result in too shallow working of portions of the field being cultivated.

When the operator reaches the end of the row being cultivated and desires to raise the tool 38 from the soil so that he can make a sharp turn at the end of the row and cultivate another row when moving in the opposite direction, the operator may either close the manual valve V2 or reduces the throttle setting to slow down the speed of the shaft 44 below said predetermined speed to a speed of about 950 to 975 r.p.m. thereby causing the underspeed governor 190 to effect closing of the solenoid valve V1. Closing either valve V1 or V2 causes pilot valve PV to close thereby directing high-pressure hydraulic fluid into the hydraulic cylinder 34 to lift the ground-working tool 38 from the soil and to disengage the front wheel locks 35 (FIG. 9) permitting the tractor and the self-supported tiller 18 to be turned in a small radius.

The ground-working tool 38 is lowered and the front wheels locked in a forward position in response to the lowering of the tool by returning the shaft 44 to its predetermined working speed or by opening the manual valve V2. It will, of course, be understood that the operator will usually rely only on one of the valves V1 or V2 when raising the tool at the end of each row.

From the foregoing description it is apparent that the tiller of the present invention is a self-supporting tiller that includes a pair of front caster wheels and a pair of rear caster wheels connected to the body of the tiller by parallelogram linkages. The tiller includes a lift control system having a hydraulic lift cylinder which is actuated to raise the ground-working tool from the soil when the power input shaft is driven at a speed less than a predetermined speed. The lifting of the tool is performed independently of the forward speed of the tractor which speed may be varied by the selection of one of several speed ranges by virtue of the usual tractor transmission. The control system also includes a directional control system which comprises a pair of front caster wheel locks that automatically lock both front caster wheels in a straightforward position when the ground-working tool is lowered into the soil.

Although the best mode contemplated for carrying out the present invention has been herein shown and described, it will be apparent that modification and variation may be made without departing from what is regarded to be the subject matter of the invention.

What is claimed is:

1. A mobile self-supporting tiller comprising a rotary ground-working tool, a pivotal frame rotatably supporting said tool, a plurality of wheels including front and rear wheels providing sole support for said frame, linkage means movable connecting said frame to said wheels, a power cylinder supported by said frame and connected to said linkage means for lifting said tool, a pump on said frame, an adjustable lift control hydraulic system connecting said pump to said cylinder, power means connected to said frame for moving said frame along a predetermined path, power-transmitting means including an input shaft extending between said front wheels and said rear wheels connecting said power means to said pump and to said ground-working tool, an adjustable underspeed governor on said frame driven by said input shaft, and control means for said hydraulic system operated by said adjustable underspeed governor for causing said power cylinder to lift the tool when the speed of said input shaft falls below a predetermined value.

2. The tiller of claim 1, wherein said power means is supported on a towing vehicle which towing vehicle comprises an engine, a variable speed transmission connected to drive wheels, and a power takeoff shaft driven at speeds independent of the speed of the drive wheels, said input shaft being driven by the power takeoff shaft.

3. A mobile self-supporting tiller according to claim 2 wherein two of said frame supporting wheels are front caster wheels which are disposed outwardly of the drive wheels of said vehicle, and additionally comprising lock means for locking said front caster wheels in a straightforward position, and means responsive to the downward movement of the tool into the soil for locking said front wheels in a straight forward position and responsive to movement of the tool out of the soil to release the caster wheels for free castering movement.

4. A mobile self-supporting tiller adapted to be connected to and moved along a path by a steerable towing vehicle including drive wheels, a power takeoff, an engine, and means for drivingly coupling said engine to the drive wheels and to the power takeoff: comprising a frame; a rotary ground-working tool supported by said frame; a plurality of front wheels; front movable mounting means for connecting said wheels to said frame; a rear wheel; rear movable mounting means for connecting said rear wheel to said frame; a power cylinder supported by said frame and having a piston rod projecting therefrom; a linkage system movably mounted on said frame and connected to said piston rod and to said front and rear mounting means; a fast-operating hydraulic system hydraulically independent of said towing vehicle and including a pump mounted on said frame; power transmitting means adapted to be coupled to said power takeoff and including a power input shaft drivingly connected to said rotary ground-working tool and to said pump; said shaft normally being driven within a predetermined speed range during the tilling operation; and a tiller control system including adjustable lift control means operatively connected between said power cylinder, said pump, and said input shaft; said lift control means including selectively adjustable speed control means responsive to a reduction of the normal input shaft speed to a speed less than said predetermined speed for activating said lift control means for directing fluid into said power cylinder so that the ground-working tool will be lifted from its lowermost working depth, and wherein input shaft speeds within said predetermined speed range will cause said speed control means to deactivate said lift control means causing the power cylinder to lower said tool.

5. A mobile self-supporting tiller according to claim 4 wherein said front wheels are widely spaced caster wheels and wherein said towing vehicle's power-driven wheels are disposed between said front caster wheels thereby permitting sharp turns.

6. A mobile self-supporting tiller according to claim 4 wherein said lift control means includes adjustable speed control means which controls the rate of upward movement of the ground-working tool thereby adapting the tiller to operate efficiently in different types of soil.

7. A mobile self-supporting tiller according to claim 6 wherein said adjustable speed control means is also adapted to control the rate of downward movement of said ground-working tool.

8. A mobile self-supporting tiller according to claim 6 wherein the upward movement of the ground-working tool from its lowermost position to its uppermost position requires between about 3 to 4 seconds.

9. A mobile self-supporting tiller comprising a frame; a rotary ground-working tool supported by said frame; a plurality of front wheels; front movable mounting means for connecting said wheels to said frame; a rear wheel; rear movable mounting means for connecting said rear wheel to said frame; a power cylinder supported by said frame and having a piston rod projecting therefrom; a linkage system movably mounted on said frame and connected to said piston rod and to said front and rear mounting means; a pump on said frame; power means connected to said frame for moving said frame along a path; said power means including a power input shaft drivingly connected to said rotary ground-working tool and to said pump; said shaft normally being driven within a predetermined speed range during the tilling operation; a tiller control system including lift control means positively connected between said power cylinder, said pump, and said input shaft; said lift control means including speed control means responsive to a reduction of the normal input shaft speed to a speed less than said predetermined speed for activating said lift control means for directing fluid into said power cylinder so that the ground-working tool will be lifted from its lowermost working depth, and wherein input shaft speeds within said predetermined speed range will cause said speed control means to deactivate said lift control means causing the power cylinder to lower said tool; said frame supporting wheels being caster wheels, and a plurality of rear caster wheels and rear movable mounting mean being provided; said front and rear movable mounting means including parallelogram linkages pivotally connected to said frame and to said associated caster wheels; front caster wheel locking means; each locking means comprising a plate mounted to caster with said associated caster wheel and having a hole therein movable in an arcuate path, a locating pin disposed in alignment with said arcuate path and position to enter said hole when said caster wheel is disposed in a straightforward position, a cam secured to the associated parallelogram linkage, and resilient means disposed between said cam and said locking pin, downward movement of said tool being effective to compress said resilient means and to move said locking pin into said hole when the hole swings into alignment with said pin, upward movement of said tool being effective to move said cam away from said resilient means allowing said resilient means to remove said locking pin from said hole.

* * * * *